United States Patent [19]
Wilfert et al.

[11] 3,904,223
[45] Sept. 9, 1975

[54] PROTECTIVE INSTALLATION FOR COVERING WINDSHIELD COLUMNS, ROOF FRAMES AND REAR WINDOW COLUMNS ON THE INSIDE OF A VEHICLE

[75] Inventors: Karl Wilfert, Gerlingen-Waldstadt; Béla Barényi; Heinrich Haselmann, both of Sindelfingen; Hansjürgen Scholz, Echterdingen; Hans-Gerd Backhaus, Holzgerlingen; Luigi Brambilla, Sindelfingen, all of Germany

[73] Assignee: Daimler-Benz Aktiengesellschaft, Germany

[22] Filed: Oct. 4, 1974

[21] Appl. No.: 512,359

[30] Foreign Application Priority Data
Oct. 4, 1973  Germany.......................... 2349830

[52] U.S. Cl. ................... 280/150 B; 296/28 R
[51] Int. Cl.² ............................ B60R 21/04

[58] Field of Search .............. 280/150 B; 296/28 R

[56] References Cited
UNITED STATES PATENTS
| | | | |
|---|---|---|---|
| 3,539,201 | 11/1970 | Loew | 280/150 B |
| 3,560,020 | 2/1971 | Barenyi | 280/150 B |
| 3,779,595 | 12/1973 | Suzuki | 280/150 B |

*Primary Examiner*—Robert R. Song
*Attorney, Agent, or Firm*—Craig & Antonelli

[57] ABSTRACT

A protective installation for covering off windshield columns, a roof frame and a rear windshield column in the interior space of a vehicle, particularly of a passenger motor vehicle, which is formed by a plastically deformable padded deformation member in the form of a hollow body which faces the vehicle interior space with a curved surface and is provided on its backside with fastening surfaces which are matched to the parts to be covered off.

20 Claims, 6 Drawing Figures

PATENTED SEP 9 1975          3,904,223

PROTECTIVE INSTALLATION FOR COVERING WINDSHIELD COLUMNS, ROOF FRAMES AND REAR WINDOW COLUMNS ON THE INSIDE OF A VEHICLE

The present invention relates to a protective installation constituted by a plastically deformable padded deformation body for covering off windshield columns, a roof frame and rear window columns in the interior space of a vehicle, especially of a passenger motor vehicle.

In one known construction (German Pat. No. 1,289,755) the deformation member consists of a padded rail which is secured at the body or at the corresponding parts of the vehicle frame at a distance with respect to the side wall by means of deformation members. This type of construction, which is advantageous in principle, entails certain difficulties in practice. Since the rail cannot be constructed very form-rigid by reason of the aimed-at purpose, difficulties result during the storing and the transportation. The danger exists that the rail is deformed so that the subsequent assembly is rendered difficult and its optical impression is impaired. Additionally, it is somewhat unfavorable that the rail at those fastening places, at which it is secured with the aid of deformation elements, offers a higher deformation resistance so that locally increased loads and stresses result which may then possibly lead to injuries.

The present invention is concerned with the task to provide a protective installation of the aforementioned type which offers no difficulties for the storing and the transporting and which possesses a far-reachingly identical deformation resistance while making available a relatively large deformation path over its entire area. The present invention essentially consists in that a hollow body serves as deformation member which faces the vehicle interior space with a curved surface and which on its back side is provided with fastening surfaces which are matched to the parts to be covered off. Such a hollow body can be manufactured sufficiently accurately in practice by reason of its sufficient inherent rigidity in order to be able to be adapted favorably to the surfaces. Its inherent rigidity thereby assumes that it is not subjected as readily to deformations during the storing and during the transportation even though in case of local loads, as may occur in case of an accident, it can be kept sufficiently deformation-soft in order to avoid the danger of serious injuries. Since this hollow body is secured directly and abuts uniformly at the parts to be covered off, it entails no difficulties to construct the same in such a manner that it offers uniformly over its entire length a far-reachingly constant deformation resistance.

In one advantageous embodiment of the present invention, provision is made that the hollow body is formed from a profiled sheet metal member whose connecting flanges point in the direction of the structural part to be covered off. Such a hollow body entails the advantage that it includes connecting flanges in only one place, which may be so placed that they do not point with a sharp edge toward the vehicle interior space.

According to a further feature of the present invention, provision is made that the hollow body includes a profiling in the form of a tubular member within the area of its edge delimiting a door-opening or window cutout of the vehicle body. This advantageous construction additionally leads to the fact that a relatively large deformation path is still available within this area also in case of small dimensions.

According to a still further feature of the present invention, provision is made that the padding projects beyond the lateral edges of the hollow and is provided with abutment surfaces for the abutment at the body or at parts of the frame of the vehicle. The entire protective installation becomes thereby a structural part which adjoins the body or framework, whereby an aesthetically pleasing impression is obtained. Additionally, the advantage results therefrom that dirt deposits within the area of the protective installation are avoided.

Accordingly, it is an object of the present invention to provide a protective installation for covering off windshield columns, roof frames and rear window columns in the interior space of a motor vehicle which avoids by simple means the aforementioned shortcomings and drawbacks encountered in the prior art.

Another object of the present invention resides in a protective installation for covering windshield columns, roof frame parts and rear window columns in the interior space of a vehicle, which not only eliminates the problems as regards storing and transportation but additionally assures a relatively large deformation path over its entire area.

A further object of the present invention resides in a protective installation of the type described above which possesses a far-reachingly uniform deformation resistance while at the same time maintaining a relatively large deformation path over its entire surface.

Still a further object of the present invention resides in a protective installation for covering off windshield columns, roof frame parts and rear window columns in the interior space of a vehicle, which has a sufficient inherent rigidity, yet can be constructed sufficiently deformation-soft to avoid the danger of serious injuries in case of an accident.

Still another object of the present invention resides in a protective installation of the type described above which avoids effectively sharp edges that point into the vehicle interior space and which assures a relatively large deformation path even with relatively small dimensions.

Another object of the present invention resides in a protective installation of the type described above which not only ensures an aesthetically pleasing appearance but which also avoids the collection of dirt within the area of the protective installation and especially behind the same.

These and other objects, features and advantages of the present invention will become more apparent from the following description when taken in connection with the accompanying drawing which shows, for purposes of illustration only, one embodiment in accordance with the present invention and wherein.

Figure 1:
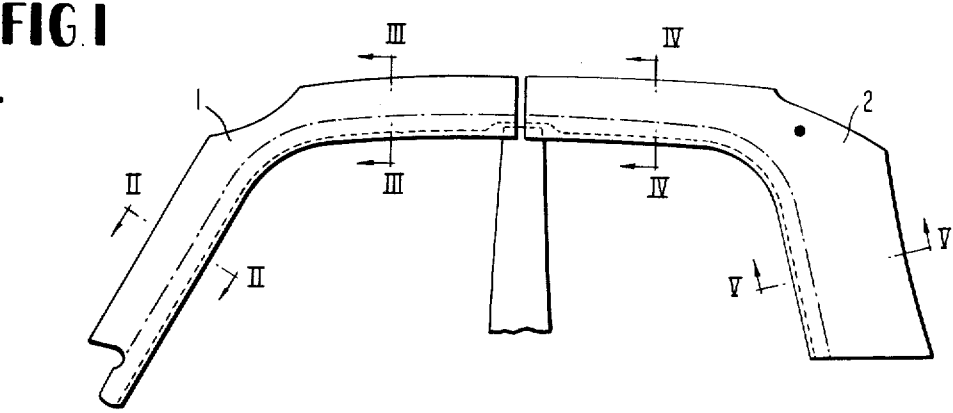
FIG. 1 is an elevational view, from the inside of a vehicle, of a protective installation according to the present invention which is to be mounted on the right side of the vehicle.
Figure 2:
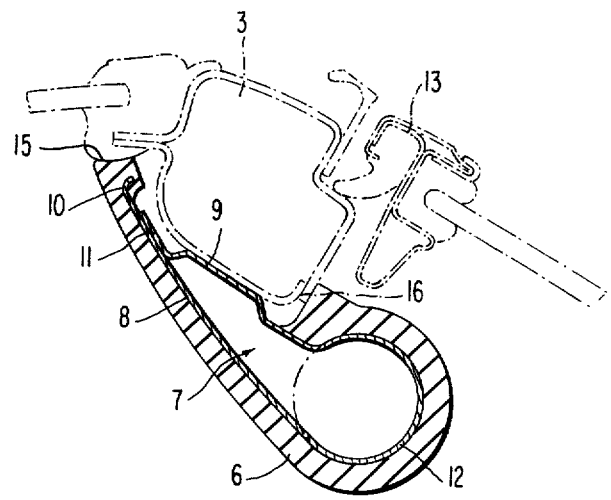
FIG. 2 is a cross-sectional view, taken along line II—II of FIG. 1, with an illustration of a windshield column to be covered off in accordance with the present invention.
Figure 3:
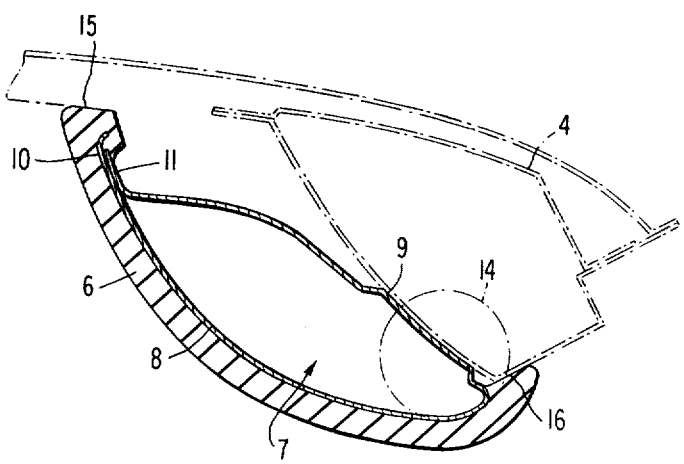
FIG. 3 is a cross-sectional view, taken along line III—III of FIG. 1, with a roof frame to be covered off in accordance with the present invention.
Figure 4:
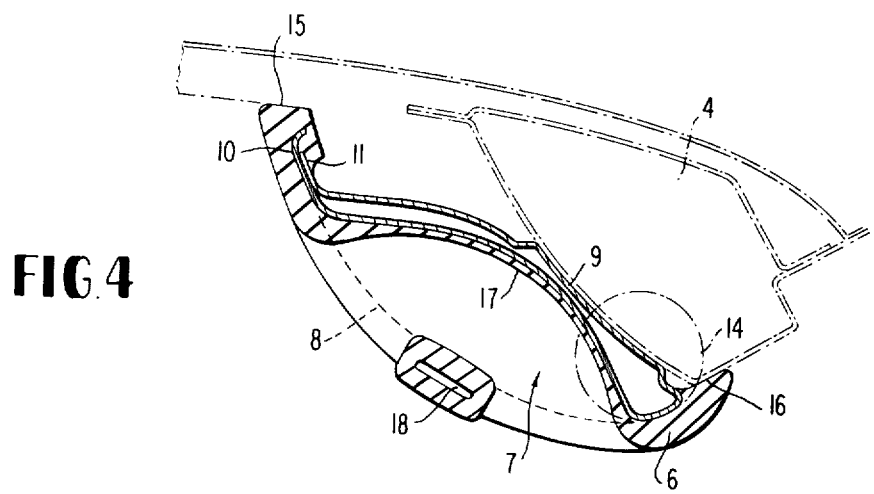
FIG. 4 is a cross-sectional view, taken along line IV—IV of FIG. 1, with a roof frame to be covered off in accordance with the present invention.
Figure 5:
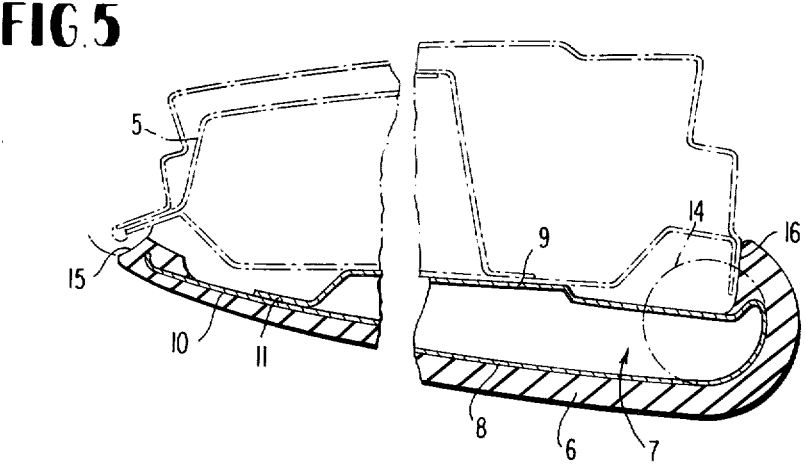
FIG. 5 is a cross-sectional view, rotated through about 180°, taken along line V—V of FIG. 1, with a rear window column to be covered off in accordance with the present invention.
Figure 6:
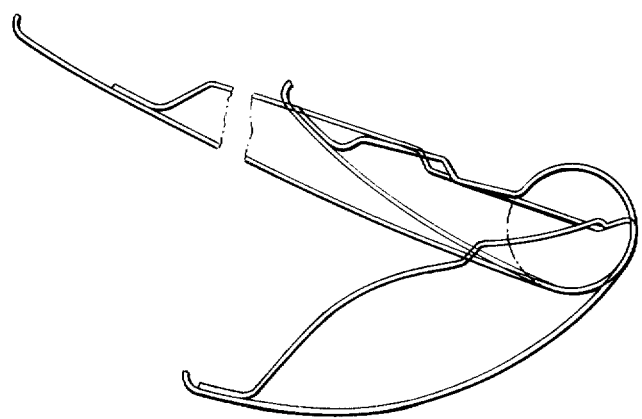
FIG. 6 is a combined representation of three cross sections corresponding to FIGS. 2, 3 and 5 which are nested one within the other.

Referring now to the drawing wherein like reference numerals are used throughout the various views to designate like parts, and more particularly to FIG. 1, this figure illustrates how a protective installation consisting of two parts 1 and 2 is mounted on the right-hand side in the interior of a vehicle in order to cover off a windshield column 3 (FIG. 2), a roof frame (FIGS. 3 and 4), and a rear window column 5 (FIG. 5). The separating place is located in the center of the door cut-out which is provided thereat with a door column. The protective installation according to the present invention is to offer a protection for the vehicle passengers who in case of an accident are thrown and impinge against the same with their body parts. It is therefore constructed as a deformation member generally designated by reference numeral 7 covered off with a padding 6 of foamed material or the like of conventional type, which is plastically deformable by an impinging body part under dissipation of the kinetic energy.

With such a protective installation, there exists the difficulty that a sufficient deformation path has to be made available without reducing excessively the vehicle interior space. Additionally, such a protective installation must possess a sufficient form-rigidity in order not to be damaged during the storing or during transportation. The deformation member 7 is constructed as hollow body which includes a curved surface or area 8 facing the vehicle interior space, which is covered off by means of the padding 6. On the oppositely disposed back side, it is provided with fastening surfaces 9 which are matched to the contour of the parts to be covered off. A fastening at the parts to be covered off takes place with the aid of conventional clips or clamps in a manner not illustrated in detail which are inserted in corresponding bores of the fastening surfaces 9 and of the windshield column 3, of the roof frame 4, and of the rear window column 5. Since such type of fastenings are known in the art, a detailed description thereof is dispensed with herein.

The two parts of the deformation member 7 which are intended for the forward and rearward area, are each bent out of a unitary, one-piece profiled sheet metal member which is connected at its ends by connecting flanges 10 and 11, for example, by spot welding. This offers the advantage that within the area in which the impact is most likely to occur, sharp-edged connecting flanges can be avoided and that the connecting flanges 10 and 11 can be displaced into a less-endangered area. They are thereby so disposed that they extend approximately parallel toward the walls of the parts 3, 4 and 5 to be covered off.

Within the most endangered area, namely within the area of the edge of the windshield column 3 facing the vehicle interior space, the hollow member 7 includes a profiling 12 (FIG. 2) which has essentially the shape of a round pipe. This profiling 12 forms the edge of the protective installation delimiting a cut-out for a door 13. The profiling 12 in the shape of a tubular pipe is continued at least partly over the entire protective installation as is indicated by the circles 14 in dash and dot lines in FIGS. 3, 4 and 5. It is thereby so constructed that within the areas of the roof frame 4, it still possesses at least a semi-cylindrical cross section. It becomes possible thereby to provide a still relatively large deformation path within the area of the door cut-out without significantly impairing the available boarding height. Within the area of the rear column 5, the profiling is then enlarged to an approximately three-quarter circle.

The padding 6 consisting of foamed material, particularly of integral foam of conventional type, projects beyond the lateral edges of the hollow member 7 and forms abutment surfaces 15 and 16, by means of which it abuts against the adjoining structural parts so that the entire protective installation is installed homogeneously into the vehicle interior space. A dirt deposit or collection behind the protective installation is avoided thereby.

As can be seen from FIG. 4, the hollow member 7 is provided at one or several places within the area of the roof frame 4 with a trough-shaped recess 17 covered by the padding 6, which is bridged by a flat member 18 of curved or arcuate shape which is also padded and which extends in the contour of the curved outer surface 8 or of the padding 6. Handle bars are created thereby which may serve for facilitating to the passengers the boarding and leaving of the vehicle.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims. We claim:

1. A protective installation for covering off structural parts in the interior space of a vehicle, which includes a plastically deformable padded deformation means, characterized in that a hollow body serves as deformation means which faces the vehicle interior space with a curved surface thereof and which is provided on the back side thereof with fastening surfaces which are substantially matched to the parts to be covered off.

2. A protective installation according to claim 1, characterized in that the protective installation is to cover off windshield columns, a roof frame and rear window columns in the interior space of a vehicle.

3. A protective installation according to claim 1, characterized in that the deformation means is padded with a layer of material plastically deformable in case of impact thereagainst under dissipation of kinetic energy.

4. A protective installation according to claim 3, characterized in that the hollow body is formed of a profiled sheet metal member provided with connecting flanges which point in the direction toward the part to be covered off.

5. A protective installation according to claim 4, characterized in that the hollow body within the area of its edge is provided with a profiling in the shape of a tubular member.

6. A protective installation according to claim 5, characterized in that the hollow body is provided within the area of its edge delimiting a door or window cut-out of the vehicle body with a profiling in the form of a circular pipe.

7. A protective installation according to claim 5, characterized in that the hollow body provided with the padding includes a separating place within the area of a column.

8. A protective installation according to claim 7, characterized in that said column is a door column.

9. A protective installation according to claim 7, characterized in that said column is a window column.

10. A protective installation according to claim 7, characterized in that the padding projects over the lateral edges of the hollow body and is provided with abutment surface means for the abutment at the structural parts of the vehicle.

11. A protective installation according to claim 10, characterized in that said structural parts consist of one of body and frame parts.

12. A protective installation according to claim 10, characterized in that the hollow body is provided with at least one trough-shaped recess within its area serving for covering off the roof frame which is covered by a flat padded, handle-like member.

13. A protective installation according to claim 12, characterized in that the hollow body is provided with several trough-shaped recesses.

14. A protective installation according to claim 13, characterized in that the deformation means is padded with a layer of material plastically deformable in case of impact thereagainst under dissipation of kinetic energy.

15. A protective installation according to claim 14, characterized in that the hollow body is provided within the area of its edge delimiting a door or window cut-out of the vehicle body with a profiling in the form of a circular pipe.

16. A protective installation according to claim 1, characterized in that the hollow body within the area of its edge is provided with a profiling in the shape of a tubular member.

17. A protective installation according to claim 1, characterized in that the hollow body is provided within the area of its edge delimiting a door or window cut-out of the vehicle body with a profiling in the form of a circular pipe.

18. A protective installation according to claim 1, characterized in that the hollow body includes a separating place within the area of a column.

19. A protective installation according to claim 1, characterized in that the padding projects over the lateral edges of the hollow body and is provided with abutment surface means for the abutment at the structural parts of the vehicle.

20. A protective installation according to claim 1, characterized in that the hollow body is provided with at least one trough-shaped recess within its area serving for covering off the roof frame which is covered by a flat padded, handle-like member.

* * * * *